United States Patent [19]
Bizuneh et al.

[11] Patent Number: 5,805,891
[45] Date of Patent: Sep. 8, 1998

[54] SYSTEM AND METHOD FOR MANAGING MAINTENANCE OF COMPUTER SOFTWARE

[75] Inventors: Girma Sitotaw Bizuneh; Russel Lyman Brooks, both of San Jose; Michael J. Daniel, Morgan Hill, all of Calif.

[73] Assignee: International Business Machines Corporation, Armonk, N.Y.

[21] Appl. No.: 507,561

[22] Filed: Jul. 26, 1995

[51] Int. Cl.$^6$ ...................................................... G06F 11/00
[52] U.S. Cl. ...................... 395/704; 395/712; 395/200.1
[58] Field of Search .................... 395/712, 704, 395/200.1

[56] References Cited

U.S. PATENT DOCUMENTS

| | | | |
|---|---|---|---|
| 5,339,430 | 8/1994 | Lundin et al. | 395/712 |
| 5,367,686 | 11/1994 | Fisher et al. | 395/712 |
| 5,410,703 | 4/1995 | Nilsson et al. | 395/712 |
| 5,421,009 | 5/1995 | Platt | 395/712 |
| 5,493,682 | 2/1996 | Tyra et al. | 395/712 |
| 5,499,357 | 3/1996 | Sonty et al. | 395/500 |
| 5,579,222 | 11/1996 | Bains et al. | 395/712 |

*Primary Examiner*—Kevin A. Kriess
*Attorney, Agent, or Firm*—Sterne, Kessler, Goldstein & Fox P.L.L.C.; Prentiss W. Johnson, Esq.

[57] ABSTRACT

A system and method for managing the maintenance of computer software is provided. The invention receives a software maintenance module. The invention verifies the validity of the software maintenance module. The invention builds a maintenance job for the software maintenance module. The invention determines whether the software maintenance module requires test, and submits the module to test if required. The invention evaluates the installation and/or test results of a software maintenance module. The invention sends the software maintenance module to end users. The invention coordinates the exchange of information between software developers, system managers, and end users. The invention performs oversight functions on a periodic basis. The invention provides a user interface for manual control of automatic functions.

24 Claims, 12 Drawing Sheets

SYSTEM AND METHOD FOR MANAGING MAINTENANCE OF COMPUTER SOFTWARE

TECHNICAL FIELD

The present invention relates generally to computer software, and more specifically to a system and method for managing the maintenance of computer software.

BACKGROUND ART

Computer software, like computer hardware, requires periodic maintenance and/or updating. Computer software maintenance may take the form of a computer software developer modifying a program to enhance the program (i.e., to create an updated version) or to fix a "bug" in the program, it may take the form of a software distributor receiving, testing and distributing modified software, or it may take the form of an end user installing these new versions or "fixes." The present invention is directed at these latter two tasks, namely managing the receipt, testing, and distribution of software maintenance and updates.

In general, computer software maintenance is a time consuming labor intensive task. Four maintenance aspects which are particularly burdensome are manual installation of program fixes, manual record keeping associated with required and/or attempted fixes, manual recovery from unsuccessfully attempted fixes (i.e., fixes installed with unresolved dependencies), and manual maintenance-related communication (i.e., fix status and/or results communicated between sites providing software fixes and sites testing those fixes, or between sites requiring verified software fixes and sites providing those fixes).

As the complexity of computer software increases, the difficulty of performing associated maintenance increases as well. Furthermore, with the advent of local area computer networks (LANs) and wide area computer networks (WANs), the physical separation between the location of software development sites, software management sites, software testing sites, and end user sites has increased. This increased physical separation also contributes significantly to the difficulty of managing computer software maintenance.

Therefore, what is needed is a system and method for managing computer software maintenance, ideally suited for use in either a local or a distributed computer environment. Such a method should preferably be automated to the fullest extent possible. At the same time, the method should be designed with maximum flexibility so as to accommodate future maintenance needs.

DISCLOSURE OF INVENTION

To achieve the foregoing and in accordance with the purposes of the present invention, as embodied and described herein, the system and method of the present invention was devised. The present invention comprises a method, or computer program product, for managing maintenance of computer software. To accomplish this, the present invention performs the steps described below.

The present invention receives, from a computer software center over a receiving network, a software maintenance module. The present invention verifies, using a local processing system, whether the received software maintenance module is valid. The present invention scans, using the local processing system, a status file to determine whether the software maintenance module is ready to be submitted to the local processing system. The present invention builds, using the local processing system, a maintenance (batch) job for the software maintenance module and submits the software maintenance module to the local processing system. The present invention evaluates, using the local processing system, a result returned from the local processing system to determine a status associated with the submission. The present invention distributes, over a distribution network, the software maintenance module to an end user.

The present invention further determines, using the local processing system, whether the software maintenance module requires test. The present invention further controls, in the local processing system, the frequency of submission of the software maintenance modules to test. The present invention maintains an administrative history log indicative of received, tested and distributed computer maintenance modules. The present invention also creates, on a periodic basis, an archive file of computer maintenance modules. The present invention further processes a request(s) made by a system manager, including requests for certain reports.

Alternatively, the present invention comprises a system, or computer program product, for managing the maintenance of computer software. In this embodiment, the present invention includes means for receiving, from a computer software center over a receiving network, a software maintenance module. The present invention includes means for verifying whether the software maintenance module is valid. The present invention includes means for scanning a status file to determine whether the software maintenance module is ready to be submitted to a processing sub-system. The present invention includes means for building a maintenance (batch) job for the software maintenance module and submitting the software maintenance module to the processing sub-system. The present invention includes means for evaluating a result returned from the processing sub-system, to determine a status associated with the submission. The present invention includes means for distributing the software maintenance module to an end user.

The present invention further includes means for determining whether the software maintenance module requires test. The present invention further includes means for controlling the frequency of submission of the software maintenance modules to test. The present invention further includes means for maintaining an administrative history log indicative of received, tested and distributed computer maintenance modules. The present invention further includes means for creating, on a periodic basis, an archive file of computer maintenance modules. The present invention further includes means for processing a request made by a system manager, including a request for certain reports.

The foregoing and other objects, features and advantages of the invention will be apparent from the following more particular description of (a) preferred embodiment(s) of the invention, as illustrated in the accompanying drawing(s).

BRIEF DESCRIPTION OF DRAWINGS

The foregoing features and advantages of the present invention will be apparent from the following more particular description of the preferred embodiments, as illustrated in the accompanying drawings, wherein.

BEST MODE FOR CARRYING OUT THE INVENTION

1. Overview of the Invention

A preferred embodiment of the present invention is now described with reference to the figures where like reference numbers indicate identical or functionally similar elements. Also in the figures, the digit(s) to the left of the two right-most digits identify the figure in which the reference number is first used. While specific steps, configurations and arrangements are discussed, it should be understood that this is done for illustrative purposes only. A person skilled in the relevant art will recognize that other steps, configurations and arrangements can be used without departing from the spirit and scope of the present invention.

The system and method of the present invention was developed to simplify the difficult task of managing the maintenance of computer software. As will be discussed in greater detail below, the present invention was designed to effectively and properly manage software maintenance over even the most difficult set of conditions—i.e., where the software fixes are developed at any number of remote locations, the fixes are channelled through a centralized maintenance center, and are then distributed to end software users at any number of additional remote locations. One skilled in the art will recognize that even where any of these locations is local instead of remote (i.e., where software fixes are provided internally or the end users are internal), the system and method of the present invention will also effectively provide the required software maintenance management.

Before describing the system and method of the present invention, it will be helpful to consider a typical development/testing/installation environment associated with complex computer programs. Computer programs are frequently developed at specialized software development labs, separate and distinct from distribution/testing or end-user locations. Such programs are then initially sent to testing or distribution locations, and from there delivered to end users. Therefore, when an improvement, upgrade, or "fix" is required on such a program, the process of coordinating the testing and distribution is quite complex.

First, the software developer must send the piece of software maintenance to the distribution location. At this stage in the overall process, such software maintenance may be thought of as a program temporary fix, or "PTF." The distribution location must receive the PTF and coordinate testing of the PTF (if required). After testing is completed, the distribution location must either distribute the PTF to end users who require it, or return it to the software developer if corrections are required. Throughout this process, there is a need for detailed record keeping, both as to the receipt and distribution of PTFs as well as with respect to test or user feedback. The present invention manages this complex process.

Figure 1:
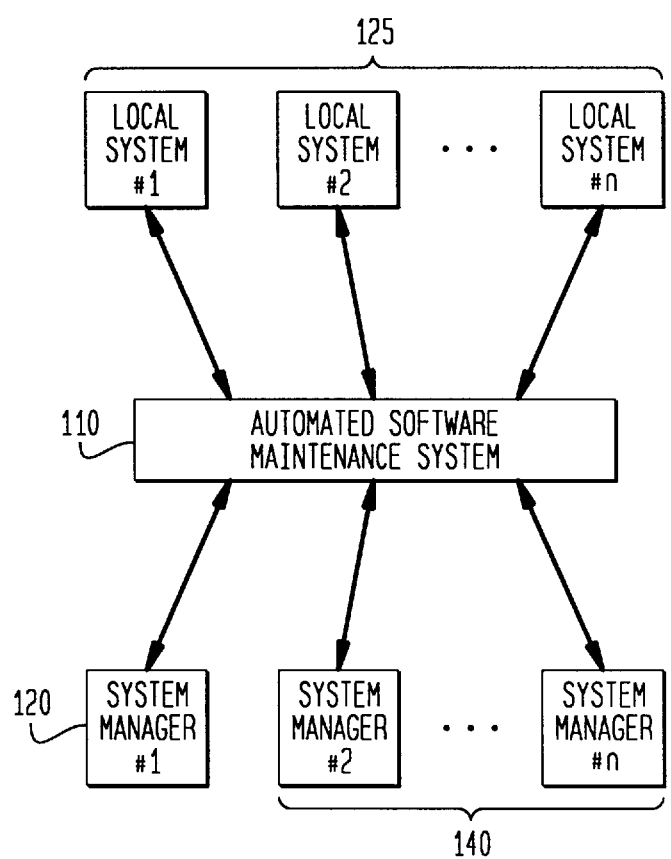
FIG. 1 is a high-level schematic diagram of the automated software maintenance system of the present invention.

FIG. 1 illustrates a high-level block diagram of an environment in which an automated software maintenance system 110 of the present invention manages the maintenance of software. As shown, the automated software maintenance system 110 may use one (or more) local computer systems 125 to perform software maintenance management for software to be installed on any number of end user systems (shown in FIG. 2). By employing the automated software maintenance system 110, as few as one system manager 120 can effectively manage software maintenance for any number of computer programs (not shown), to be installed on any number of end user systems. Of course, as the number of computer programs and/or end user systems to be maintained increases, additional system managers 140 may be required.

Figure 2:
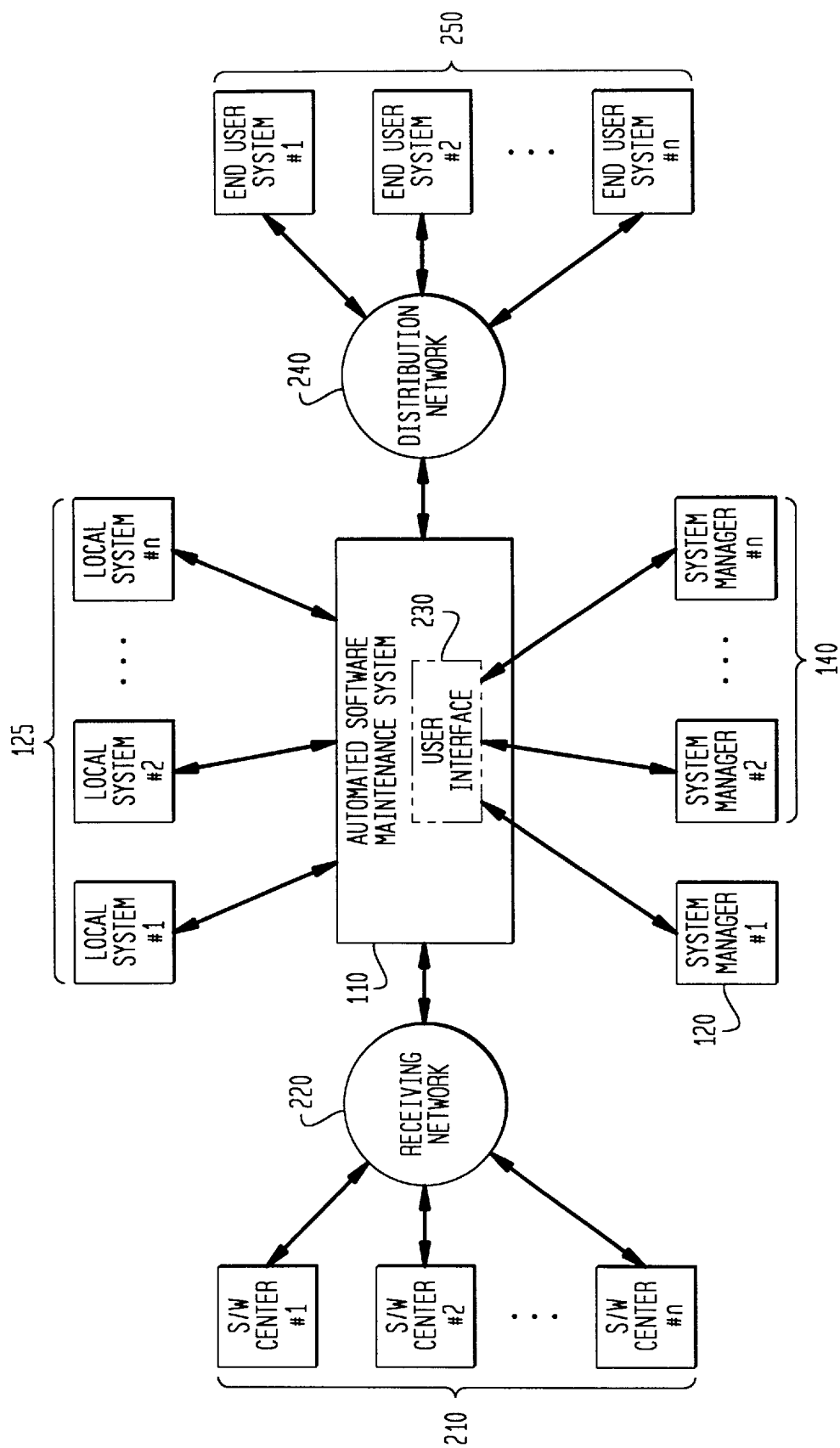
FIG. 2 is a high-level schematic diagram of a computer system incorporating the present invention.

A preferred embodiment of such an implementation is further illustrated by FIG. 2. As described above, software development center(s) 210 develop PTFs which must ultimately be installed on end user systems 250. To minimize the need for manual intervention, the automated software maintenance system 110 of the present invention is adapted to receive PTFs from software development center(s) 210 over a receiving network 220. After receiving PTFs via receiving network 220 (or some other means), automated software maintenance system 110 uses local system(s) 125 to process received PTFs. To provide maximum automation of the maintenance process, automated software maintenance system 110 preferably runs continuously, 24 hours a day, to accept PTFs supplied over the receiving network 220.

System manager(s) 120, 140 oversee the operation of automated software maintenance system 110 through a user interface 230 that forms a part of the automated software maintenance system 110. System manager(s) 120, 140 provide primarily an oversight function, as the automated software maintenance system 110 performs all required tasks automatically. After a PTF is received, the automated software maintenance system 110 first performs a number of tasks (detailed below) and then distributes the PTF to designated end user systems 250. To achieve maximum automation of the maintenance process, distribution network 240 may be utilized to accomplish this distribution. Alternatively, distribution may be accomplished by writing magnetic, optical, or printed media (not shown) and then distributing such media to the end users 250.

2. Detailed Description of the Invention

Figure 3:
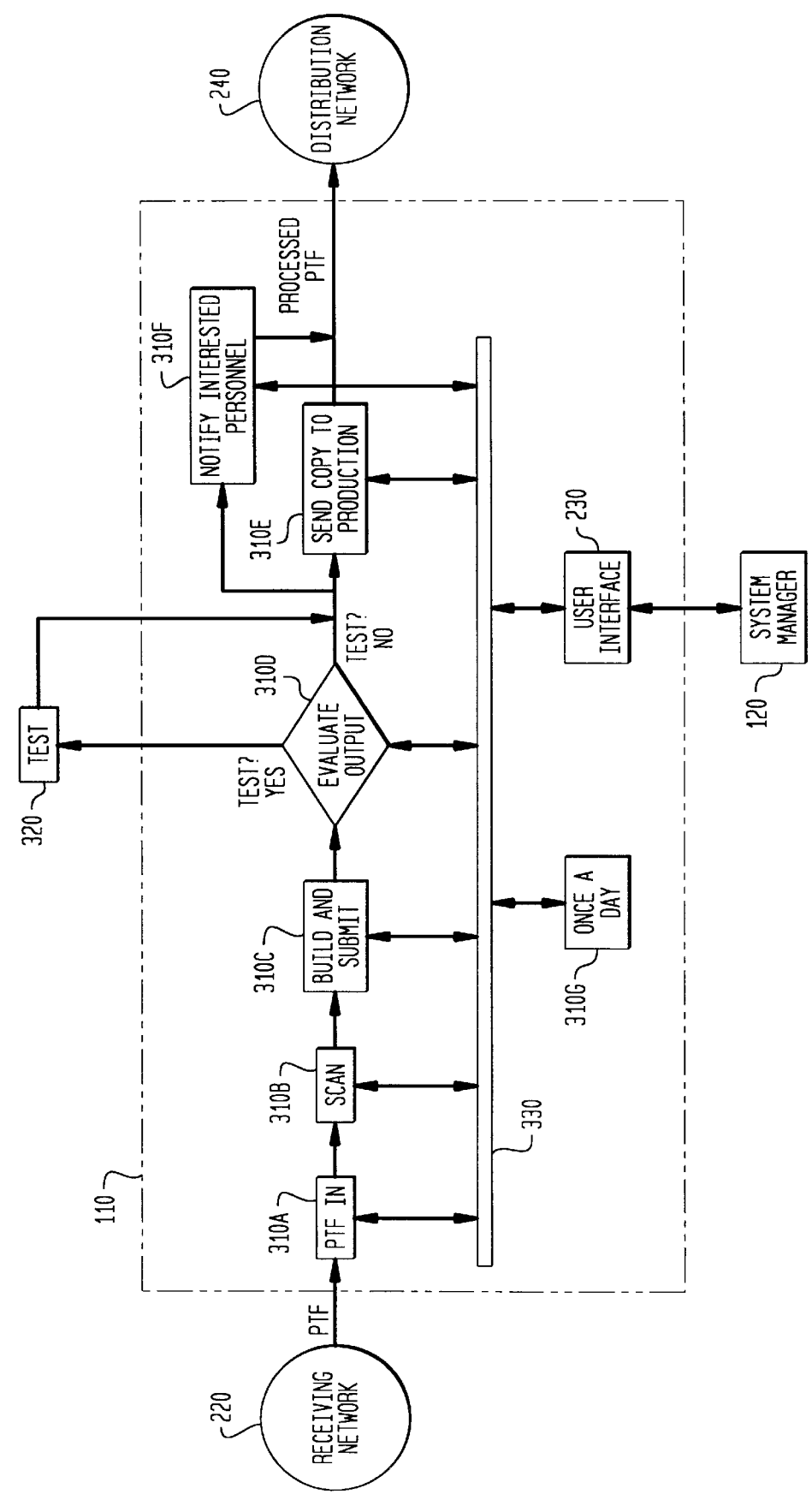
FIG. 3 is a schematic diagram of the general flow of information between the main functional components of a preferred embodiment of the present invention.

Having discussed the high level features of the present invention, a more detailed discussion can now be undertaken. FIG. 3 is a detailed block diagram of the automated software maintenance system 110, showing the main functional components. FIG. 3 further depicts the general flow of information through the main functional components of the automated software maintenance system 110. One skilled in the art will recognize that the components identified may be implemented in hardware (i.e., in a state machine implementation), in software, or through a combination of hardware and software.

In one embodiment, the automated software maintenance system 110 of the present invention may be implemented using a Multi-Virtual Storage ("MVS") system control program. This platform would include a System Modification application Program ("SMP") which permits maintenance, upgrading and servicing of other MVS platform programs. In such a case, all MVS products are installed using SMP. For further details regarding the MVS control program, see IBM publication MVS/ESA SP V5, "General Information," document # GC28-1422-00, which is incorporated herein by reference. For further details regarding the SMP program, see IBM publication SMP/E R8.1, "Reference Summary," document # SX22-0006-11, which is also incorporated herein by reference.

As described above, automated software maintenance system 110 receives PTFs over receiving network 220. A received PTF is first processed by a PTFIn component 310A of the automated software maintenance system 110. As part of this processing, the PTFIn component 310A determines whether the received PTF will be tested before distribution to end users. After the PTFIn component 310A completes processing a received PTF, the PTF is passed to a Scan component 310B. The Scan component 310B determines the action required for the received PTF, and then passes the PTF to a Build & Submit component 310C. The Build & Submit component 310C packages the received PTF as an installation job and submits the job to one (or more) of the local systems 125.

In an alternative embodiment, instead of actually passing the received PTF from one component 310 to another, the automated software maintenance system 110 can store the received PTF in a known location (i.e., on local system 125), and then merely pass processing information related to the PTF between components 310. In such an implementation, each component 310 also has direct access to the stored PTF as may be required.

In an exemplary embodiment where the automated software maintenance system 110 is implemented in the MVS environment, once the job has been submitted to the local system(s) 125, an output is provided by MVS. This output, which can be any of Receive, Applycheck, Apply, Accept, Reject, or Restore, is received by an Evaluate Output component 310D and processing of the received PTF can continue.

Figure 6:
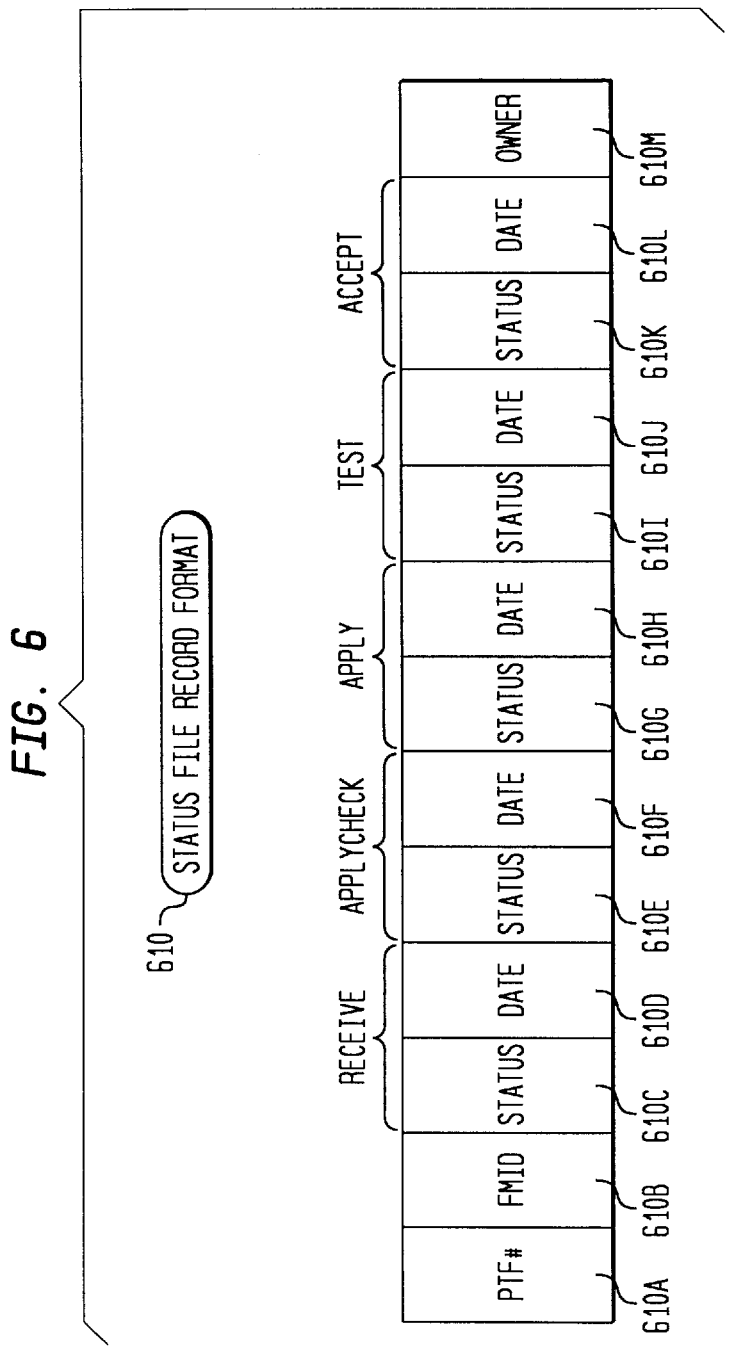
FIG. 6 is a schematic diagram of the Status File record format according to a preferred embodiment of the present invention.

As stated above, the Evaluate Output component 310D receives the output of the installation job from local system (s) 125. The Evaluate Output component 310D then checks the result of the received output. Based on the result of this check, the Evaluate Output component 310D will update a status file record associated with the received PTF (see FIG. 6). The output provided by MVS permits the automated software maintenance system 110 to determine whether the installation of a PTF onto a local system(s) 125 as described above was successful, thus permitting continued processing, or whether any additional activities are required before processing can continue.

For example, in the MVS environment, if the job type was Apply and the result returned by MVS is as expected, the evaluate output component 310D will set the Apply status field 610G to "Good". However, if the job type was Apply and the result is not as expected, the evaluate output component 310D will set the Apply status field 610G to "Bad" and it will also set the Owner field 610M to "System Manager." If, however, the job type was Applycheck and the PTF was dependent on other PTFs which are not installed, then the Evaluate Output component 310D will set the Applycheck status field 610E to "Bad" and set the Owner field 610M to "REQ." Thus, by incorporating the MVS results into a status file record, the automated software maintenance system 110 can effectively manage this stage of PTF processing.

As stated above, the PTFIn component 310A determined whether a received PTF needed to be tested before distribution to end users. Where a received PTF requires testing, the Evaluate Output component 310D sends the PTF to software Test 320 as shown in FIG. 3. Importantly, software Test 320 is shown outside of the automated software maintenance system 110 because software testing is not performed by the present invention. Rather, any PTFs requiring test are sent by the automated software maintenance system 110 to an appropriate test center (local or remote), with test results subsequently received by the automated software maintenance system 110. Received test results are reviewed by the System Manager 120. After reviewing the test results, the System Manager 120 updates Test status fields 610I and 610J of the status file record, and processing can continue according to components 310E and/or 310F.

Where the PTFIn component 310A determined that software testing was not required, a similar process is followed. In this case, as part of the Evaluate Output component 310D, the System Manager 120 merely sets Test status fields 610I and 610J to "Good," and processing can continue according to components 310E and/or 310F.

After the test results (if any) have been evaluated, the Evaluate Output component 310D passes the PTF to a Send Copy to Production component 310E. In addition, the Evaluate Output component 310D may inform a Notify Interested Personnel component 310F that testing has been completed and/or that the PTF has been sent to the Send Copy to Production component 310E, as required.

Finally, the Send Copy to Production component 310E utilizes distribution network 240 (or a suitable alternative) to distribute the tested (or untested, if testing was not required) PTF to end users 250. In addition, the Notify Interested Personnel component 310F coordinates the exchange of information between the software developers 210, software Test 320, and end users 250. A Once a Day component 310G generates reports and resubmits incomplete work on a periodic basis. A User Interface component 230 permits the system manager(s) 120, 140 to interface with the automated software maintenance system 110 as desired.

It is important to note that the general flow of information as described above is not exclusive. For example, as mentioned above, a received PTF may either be passed between components 310, or stored in a location accessible by components 310, with only processing information passed between components. In addition, in lieu of actually passing processing information between components 310, processing information may be shared between components 310 as required. This is accomplished through interface 330. Interface 330 may be implemented in hardware (i.e., a data bus), in software (i.e., tables, common variables, etc.), or through a combination of hardware and software. In one embodiment of the automated software maintenance system 110, much of the interfacing is performed through the use of shared tables and/or records (see FIG. 6, for example). By using tables that can be accessed by the various components 310, information can be "shared" among components in an effective manner.

In addition to managing the overall flow of information, each component 310 discussed above performs very specific functions. Referring next to FIGS. 4 through 11, each component of the automated software maintenance system 110 will be considered in greater detail. While the following discussion will describe the process performed by each component 310, one skilled in the art will recognize that the boundaries defined by each component are primarily for descriptive convenience, and that other functional groupings that perform the same overall function are possible.

As described above, a PTF is received from a software development center 210, either via receiving network 220 or some other means. The actual reception of PTFs received via receiving network 220 is preferably handled by an external program (not shown), such as a hot reader program. This external program receives the incoming PTFs and routes them to the automated software maintenance system 110. Alternatively, incoming PTFs may be provided on magnetic, optical, or printed media. In any case, PTFs received by the automated software maintenance system 110 are first processed by the PTFIn component 310A.

Figure 4:
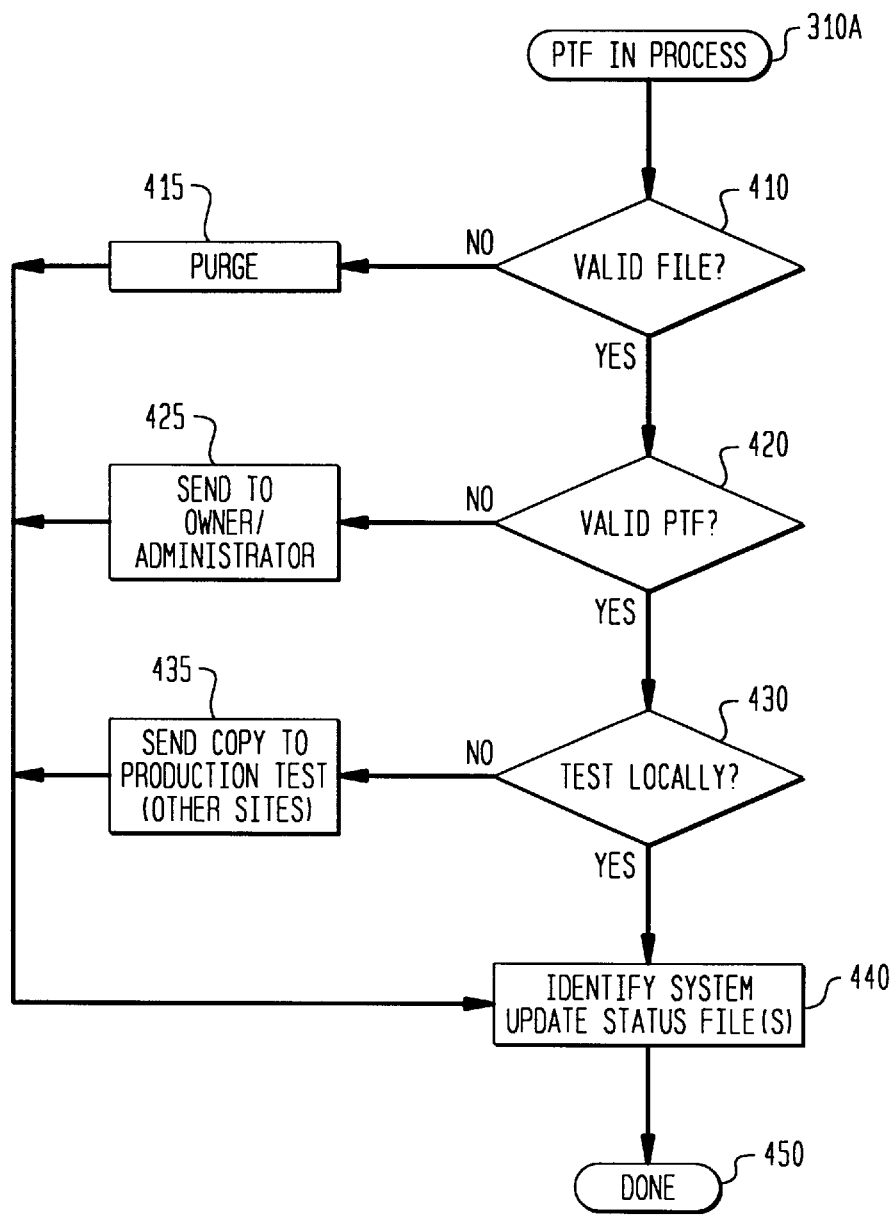
FIG. 4 is a flow-chart showing the general process flow of the PTFIn component according to a preferred embodiment of the present invention.

Referring to FIG. 4, the steps performed by the PTFIn component 310A shall now be explained. Once a PTF has been received by the PTFIn component 310A of the automated software maintenance system 110, it is processed according to steps 410–450.

In step 410, the PTFIn component 310A of the automated software maintenance system 110 tests the received PTF for validity. Step 410 is essentially a format test, and is performed to ensure that the received PTF is indeed a PTF and not merely a note, etc. If the received PTF is not actually a PTF, it is purged by the PTFIn component 310A as shown in step 415. If, however, the received PTF is in the proper format, it is tested for validity in step 420.

Step 420 is primarily a recognition test. In step 420, the PTFIn component 310A searches the received PTF for a Function Modification ID ("FMID") or "keyword." The keyword found as a result of this search is compared against a predefined table of keywords (an FMID table, not shown) included in the automated software maintenance system 110. The FMID table contains records related to each supported FMID. In each record, there is associated information relating to each local system 125. In essence, the FMID table therefore includes a list of all valid keywords. If the keyword located in the received PTF is not found in the table, the PTFIn component 310A processes the received PTF according to step 425. If the keyword located in the received PTF is found in the FMID table, the PTF is processed according to step 430.

When a received PTF is processed according to step 425 (under the conditions described above), the PTFIn component 310A sends the received PTF, together with an appropriate notification, to the owner or administrator of the automated software maintenance system 110. This notification alerts the owner/administrator that the received PTF cannot be managed automatically.

If a received PTF is not processed according to step 425, the PTFIn component 310A processes it according to step 430. In step 430, the PTFIn component 310A of the automated software maintenance system 110 determines whether the received PTF is to be tested before distribution to production sites/end users. To facilitate the making of this determination, the automated software maintenance system 110 includes a product test ("PRODTEST") table (not shown). The PRODTEST table is a product specific listing indicating which PTFs which are to be tested prior to delivery to end users 250, and which PTFs do not require test before distribution. If the PTFIn component 310A determines that the PTF does not require testing prior to distribution, then the PTF is sent to the Send Copy to Production component 310E, as shown in step 435. If the PTF does require testing before distribution, then the PTF is further processed by the PTFIn component 310A, according to step 440.

Step 440 is essentially a target system identification and status updating step. In step 440, the PTFIn component 310A determines which end user system(s) 250 any PTFs that require test must eventually be installed upon. To accomplish this, the automated software maintenance system 110 includes an ECMACH table (not shown) as well as the FMID table described above. The ECMACH table contains a list of end user system(s) 250. The FMID table contains a list that cross-references each PTF with corresponding end user system(s) 250. Both tables (ECMACH and FMID) include at least one status record that is used by the automated software maintenance system 110 to record and/or monitor the progress of PTFs that are being processed (see FIG. 6 for an exemplary status record). When a status record is first created for a PTF, each field 610A through 610M of the status record is initialized to "////." AS a PTF is processed by the automated software maintenance system 110, fields 610A through 610M associated with the PTF/end system are updated as described below (i.e., "////" is overwritten with some other value). In addition, the automated software maintenance system 110 also includes a status file corresponding to each end user system 250.

As part of step 440, after identifying the end user system (s) 250 on which the PTF must be installed (i.e., by reading the ECMACH and/or FMID tables), the PTFIn component 310A updates a status file 610 corresponding to each end user system 250. For example, if a received PTF affects 5 end user systems 250, then 5 status files (one corresponding to each end user system 250) are updated. The PTFIn component 310A updates each affected status file 610 by updating the PTF number field 610A and the owner field 610M. The PTF number field 610A is updated to include a unique number associated with each received PTF. The owner field 610M is set to "POSTSERV" to indicate that the received PTF is ready for processing. This information is used by other components (i.e., Scan component 310B) as described below.

After completion of steps 410–440, processing according to the PTFIn component 310A of the automated software maintenance system 110 is complete, as shown by step 450. Referring again to FIG. 3, the received PTF is then passed to the Scan component 310B of the automated software maintenance system 110.

Figure 5:
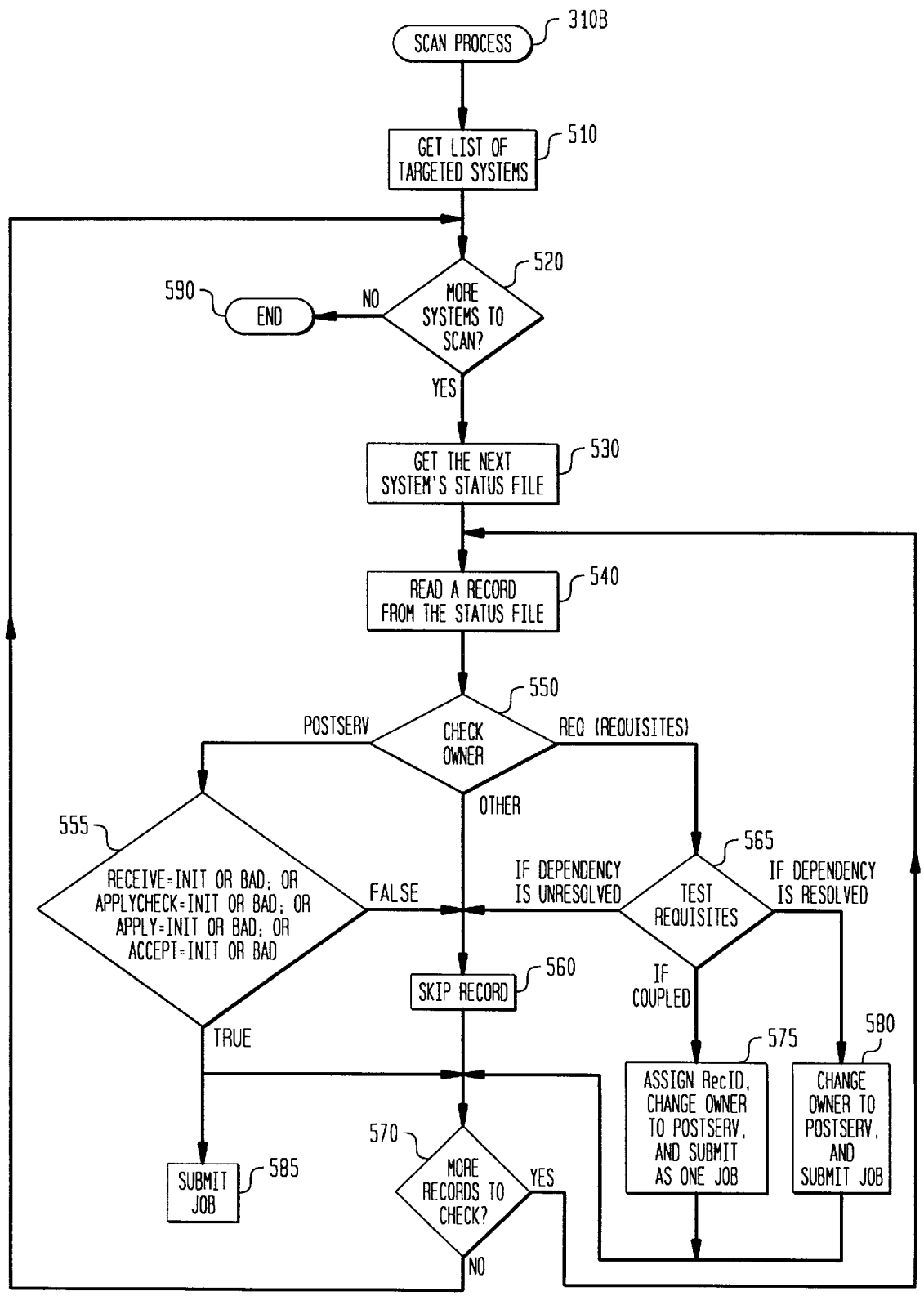
FIG. 5 is a flow-chart showing the general process flow of the Scan component according to a preferred embodiment of the present invention.

Referring to FIG. 5, the steps performed by the Scan component 310B shall now be explained. Once a PTF has been received by the Scan component 310B of the automated software maintenance system 110, it is processed according to steps 510–590.

In step 510, the Scan component 310B of the automated software maintenance system 110 gets a list of end user systems 250 that each received PTF requiring test is "targeted" for. This list is generated by reading the ECMACH/FMID tables described above. After this list is generated, each system is then "scanned" according to steps 520–590 to determine the action required to be taken with each PTF.

In step 520, the Scan component 310B uses the list generated in step 510 to determine whether system scanning is complete, or whether additional systems need to be scanned. The scanning of each system is performed in the same manner, therefore only the scanning of one system will be described in detail.

For each system that is to be scanned, the Scan component 310B reads a status file associated with that system as shown in step 530. Once the Scan component 310B reads a system status file, step 530 is complete, and processing continues according to step 540.

In step 540, the Scan component 310B reads a status file record (see FIG. 6) from the system status file. The format of the status file record is shown generally in FIG. 6, as depicted by fields 610A through 610M. Within each system status file, a separate status file record is maintained for each received PTF. Each status file record is read in the same manner, therefore only the reading of one status file record will be described in detail. After the status file record is read, step 540 is complete.

Next, the Scan component 310B checks the "ownership" of the received PTF, as shown in step 550. To check the ownership of the received PTF, the Scan component 310B of the automated software maintenance system 110 reads the owner field 610M of the status file record. As described above, the PTFIn component 310A of the automated software maintenance system 110 updated the owner field 610M as part of step 440 (see FIG. 4). When step 550 is performed, if the owner field 610M is set to "POSTSERV," then processing continues according to step 555. If the owner field 610M is set to "REQ," then processing continues according to step 565. If the owner field 610M is set to anything else, then processing continues according to step 560. Further details regarding how owner field 610M may be set are provided in the description of the Evaluate Output component 310D (below). Once this ownership determination is complete, step 550 is complete. Each of these possibilities is described in detail below.

If step 555 is performed (as described above), then Scan component 310B further checks additional fields contained in the status file record to determine what action is required for the received PTF. Specifically, the Scan component 310B checks the Receive status 610C, the ApplyCheck status 610E, the Apply status 610G, and the Accept status 610K. As described above, these fields are initialized as part of step 440 performed by the PTFIn component 310, and are updated as required during subsequent processing. For example, if Receive status 610C, ApplyCheck status 610E, Apply status 610G, or Accept status 610K are set to "Init" or "Bad," then Scan component 310B submits the PTF to the Build & Submit component 310C, according to step 585, as shown in FIG. 3 and FIG. 5. Processing would then continue as shown in step 570.

Alternatively, if Receive status 610C, ApplyCheck status 610E, Apply status 610G, or Accept status 610K are set to any other value, then Scan component 310B skips that record, as shown in step 560. If step 560 is performed (as described above), then Scan component 310B merely skips the record, as shown in step 560.

If step 565 is performed (as described above), then Scan component 310B further checks whether the dependencies associated with the PTF (as indicated by the "REQ" value in owner field 610M) are resolved such that the PTF may be submitted to the Build & Submit component 310C. To make this determination, the Scan component 310B searches the status file 610 associated with the PTF and checks whether entries 610G and 610H show "Good" (indicating that any dependencies are resolved). If the associated dependencies are resolved, then Scan component 310B changes the value in owner field 610M from "REQ" to "POSTSERV" as shown in step 580, and submits the PTF to the Build & Submit component 310C. If the associated dependencies are coupled, then two or more PTFs must be submitted together. In this case, as shown in step 575, the Scan component 310B changes the value in owner field 610M from "REQ" to "POSTSERV," assigns a common RecId to the two (or more) PTFs, and submits the PTFs together to the Build & Submit component 310C as one job. To accomplish this, the RecId number is stored in a location (not shown) associated with each affected PTF status file 610. If the associated dependencies are unresolved, then Scan component 310B skips the record, as shown in step 560. In any case, processing continues according to step 570.

Any PTFs that have unfulfilled REQ dependencies, or owners other than "POSTERV," are not processed (see step 550). Processing is suspended for two primary reasons. First, if an Apply type job were submitted before any associated dependency is resolved, it would not be able to be installed successfully. Second, if the owner is neither POSTSERV nor REQ, Scan component 310B will ignore the PTF. In such a case, system manager 120 must resolve the outstanding problem and set the owner back to POSTSERV for processing to continue. Each of these safeguards prevents installing PTFs on end user systems 250 before they have been properly processed, and therefore avoids associated system crashes.

As described above, the automated software maintenance system 110 of the present invention may be implemented using the SMP MVS program. Because SMP provides a number of output terms which can be used to indicate the installation status of a PTF (i.e., Receive, Applycheck, Apply, Accept, Restore, and Reject), the use of a status file record which contains a plurality of fields adapted to employ these SMP output terms (i.e., 610A through 610K) permits the automated software maintenance system 110 to provide maximum flexibility in automating the processing of received PTFs.

For example, when a status file is first created (as described above), the PTFIn component 310A of the automated software maintenance system 110 initializes the fields to "////." Then, when any subsequent processing step is performed, the automated software maintenance system 110 updates the associated status file field(s) as required. Thus, when a job is submitted to a local system 125, the Build & Submit component 310C may update status file 610 to show "Syyyymmdd," indicating the year, month, and day the job was "Started." Similarly, after an SMP output is received from a local system 125 and then evaluated, the Evaluate Output component 310D may update the associated status to "Gmmdd" (to reflect "Good" and the date) or "Bmmdd" (to reflect "Bad" and the date). In any case, the User Interface component 230 will format this raw data before displaying it to the system manager 120 (i.e., by translating "//////" to "Init", or "B" to "Bad").

The flexibility available under this implementation can best be seen by way of several examples. For example, if Apply status 610G is "True" (i.e., set to "Init"), although the associated PTF may be submitted in accordance with step 585 (and therefore ultimately installed on a local system 125), it may also be subsequently removed from any local system 125 on which it has been installed. Conversely, if Accept status 610K is "True," once the associated PTF has been submitted in accordance with step 585 (and therefore ultimately installed on a local system 125), it may not be subsequently removed. Furthermore, a counter(s) (not shown) may be associated with Apply status 610G. This counter may be set by the system manager 120, and may be used to limit the number of "applies" that are processed. This is particularly valuable where a software product is unstable, and it is desirable to limit the number of PTFs (i.e., fixes) that are installed. When used in this manner, the Apply status counter is preferably a decrementing counter. Similarly, a time field (not shown) may be associated with Accept status 610K. This time field may be set by the system manager 120, and may be used to specify a maximum number of days after Apply is first set during which the PTF may still be removed from end user system 250 (i.e., to permit latent permanency).

In an embodiment not using the MVS/SMP platform, status file(s) 610 must be designed to accommodate the installation method and terms of the particular system.

Once processing has reached step 560, the Scan component 310B performs step 570 to determine whether additional records need to be checked. If so, then processing continues according to step 540. If not, then processing continues according to step 520. Finally, once all records from all status files for all systems have been processed, processing according to Scan component 310B is complete, as shown by step 590. Referring again to FIG. 3, processing then continues as shown by Build & Submit component 310C.

Figure 7:
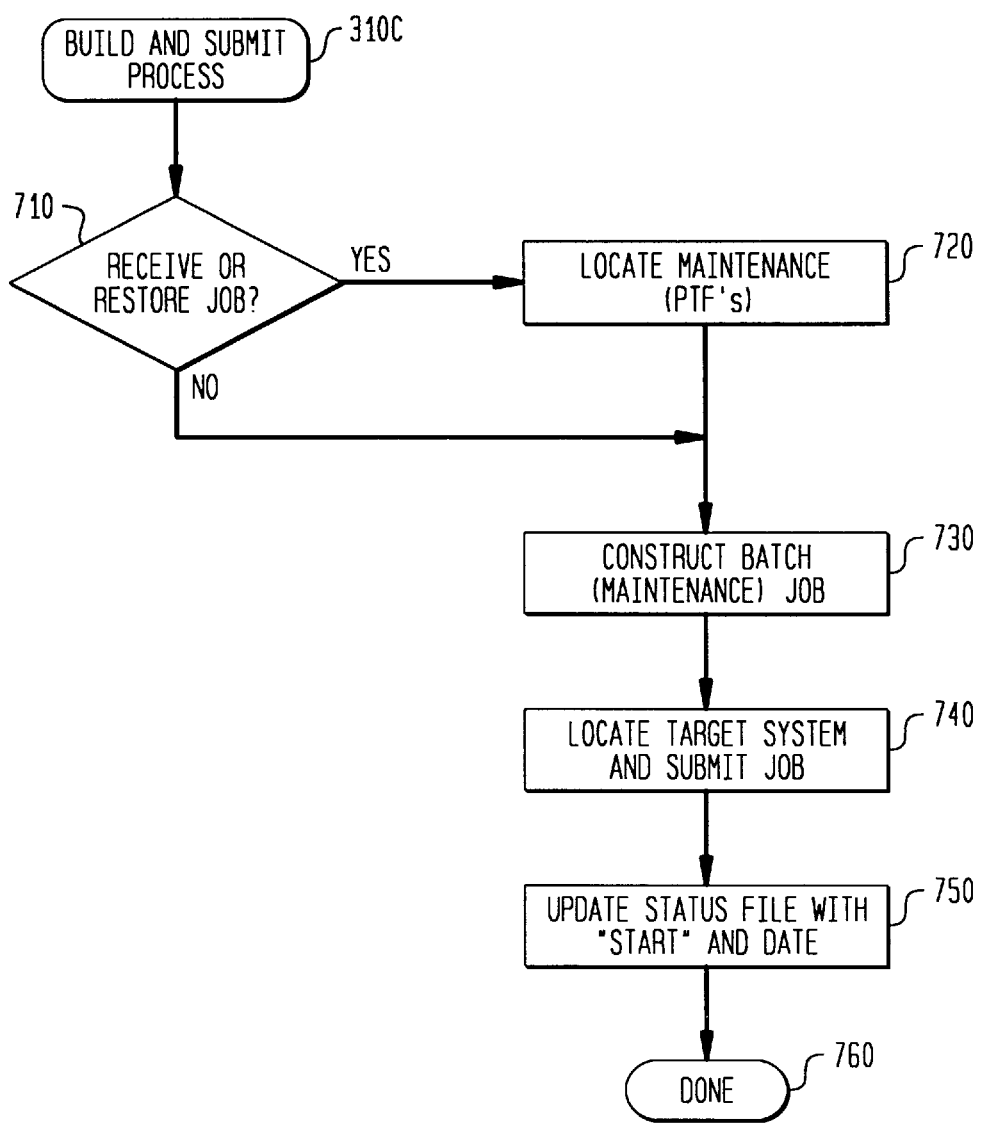
FIG. 7 is a flow-chart showing the general process flow of the Build & Submit component according to a preferred embodiment of the present invention.

Referring to FIG. 7, the steps performed by the Build & Submit component 310C shall now be explained. The Build & Submit component 310C of the automated software maintenance system 110 may be invoked either from the User Interface 230 or the Scan component 310B. For example, by using the User Interface 230, the system manager 120 may invoke the Build & Submit component 310C by setting the Accept, Reject or Restore status fields 610 to a predetermined value. Alternatively, the Build & Submit component 310C is invoked by the Scan component 310C after step 555 returns "True" and step 585 is therefore performed. In either case, once the Build & Submit component 310C is invoked, processing continues according to steps 710–760.

In step 710, the Scan component 310C of the automated software maintenance system 110 first tests whether the PTF is a Receive or a Restore job. A Receive job occurs when an SMP receive job is performed to set the PTF for Apply. A Restore job occurs when the last installation on a local system 125 has to be removed, thus "restoring" the local system 125 to its previous state. This determination may be made by using the User Interface 230 to display the PTF status file and observing "Rmmdd" ("Restore") or "Gmmdd" ("Good") in the Receive field. If the PTF is a receive job or a restore job, then processing continues according to step 720. If the PTF is neither a receive job nor a restore job, then processing continues according to step 730. Once the Build & Submit component 310C has made this determination, step 710 is complete and processing continues according to step 720 or 730 as required.

As shown in step 720, if the PTF is Receive or Restore, then Build & Submit component 310C locates any required PTFs that are to be submitted (i.e., when PTFIn component 310A has stored the received PTFs in a predetermined location). Build & Submit component 310C uses the PTF # field 610A in the status file record to locate the actual PTF. Processing then continues according to step 730. In step 730, following the completion of step 720, or following step 710 (for PTFs that are neither receive nor restore jobs), the Build & Submit component 310C constructs a batch (or maintenance) job for the PTF(s). To construct the batch job, the Build & Submit component 310C uses a packaging table, which is platform dependent. In the MVS environment, the SMPJCL, ZONE, or JOB CLASS packaging tables may be used. One skilled in the art will recognize that other tables and/or other techniques may be used to construct the batch job. Processing then continues according to step 740.

In step 740, the Build & Submit component 310C locates the target system for the PTF and submits the job constructed in step 730. Where the PTF requires test (i.e., as determined by the PTFIn component 310A in step 430), the Build & Submit component 310C packages a batch job for the requested PTF(s) and submits the applicable job to the intended local system 125. Where the PTF does not require test, processing continues according to step 750.

In step 750, the Build & Submit component 310C updates the status file record associated with the PTF to indicate the date that step 750 was completed. Processing by the Build & Submit component 310C is then complete, as shown in step 760. Referring again to FIG. 3, the job output is then passed to an Evaluate Output component 310D.

Figure 8:
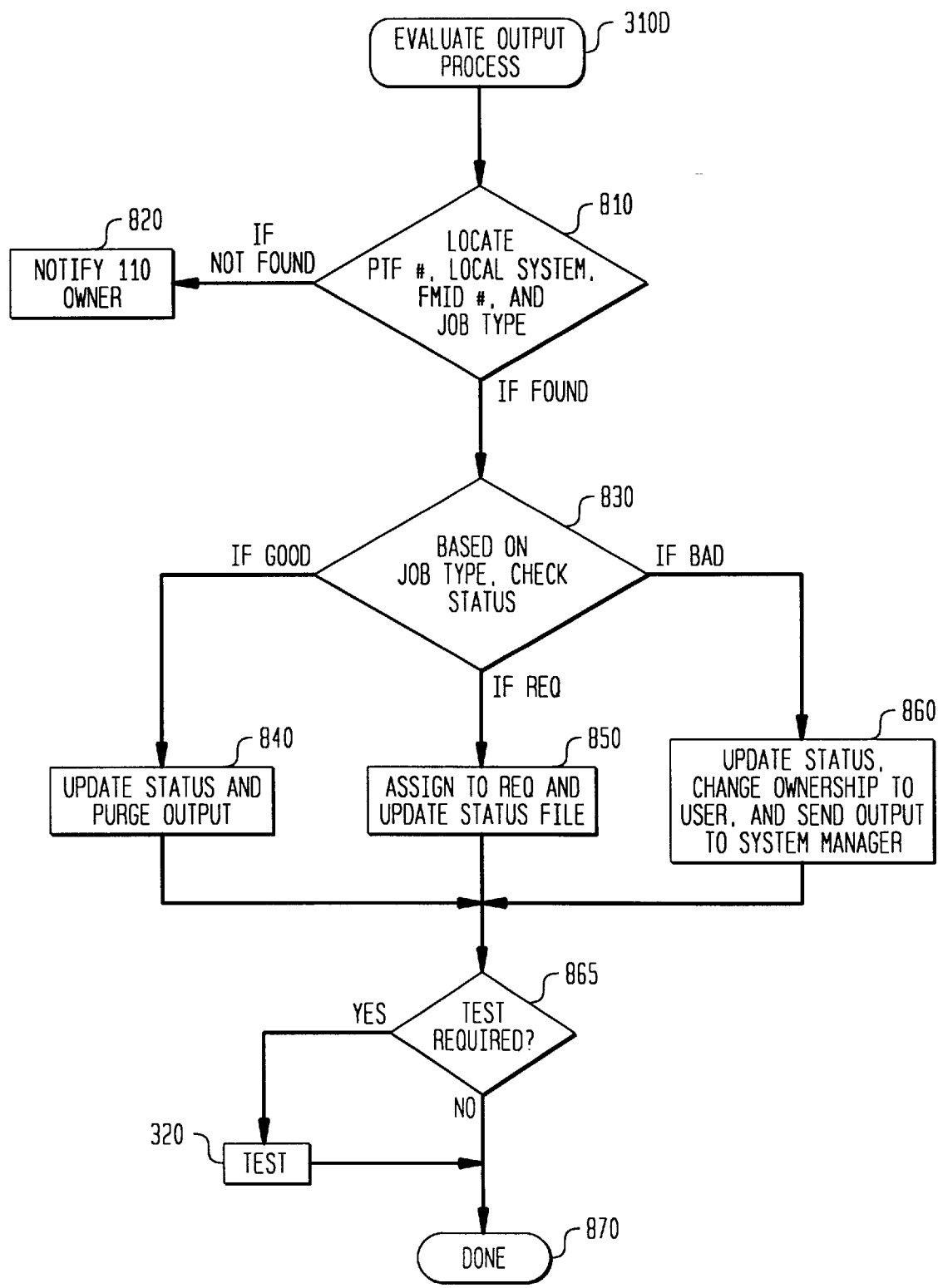
FIG. 8 is a flow-chart showing the general process flow of the Evaluate Output component according to a preferred embodiment of the present invention.

Referring to FIG. 8, the steps performed by the Evaluate Output component 310D shall now be explained. Once a job output has been received by the Evaluate Output component 310D of the automated software maintenance system 110, it is processed according to steps 810–870.

In step 810, the Evaluate Output component 310D evaluates the job output described above. The job output has a tag in it which contains information regarding the PTF end user system(s), the FMID output, and the SMP job type. If the tag is not found in the job output, the Evaluate Output component 310D will not be able to evaluate it. In this case, the output is considered as "Error" and is sent to the owner of the automated software maintenance system 110, as shown in step 820. Otherwise, processing continues according to step 830.

In step 830, the Evaluate Output component 310D again checks the status of the PTF (based on the job type) by reading the status value contained in the job output associated with the PTF. If the status is "Good" then processing continues according to step 840. If the status is "Req" then processing continues according to step 850. If the status is "Bad" then processing continues according to step 860.

If step 840 is performed (as described above), the Evaluate Output component 310D updates the status associated with the PTF to "Good" (i.e., to indicate that installation was successful) and purges the job output.

If step 850 is performed (as described above), the Evaluate Output component 310D updates the status associated with the PTF to "Bad" and assigns the ownership (i.e., field 610M) to "Req." This indicates that the PTF has some dependency which must be resolved before processing may continue further.

If step 860 is performed (as described above), the Evaluate Output component 310D updates the status associated with the PTF to "Bad", assigns the ownership (i.e., field 610M) to the system manager(s) 120, 140, and sends any associated output (i.e., failure results) to system manager 120.

As described above, the automated software maintenance manager 110 does not perform Test function 320. Therefore, Test step 320 (if required) is performed outside of the present invention. This is further illustrated in FIG. 3 and FIG. 8. As shown by step 865, after completion of step 840, 850 or 860, the Evaluate Output component 310D coordinates the testing (if required) of received PTFs. Where testing is required, the system manager 120 will wait for the test results, and when the results are acceptable, mark the status file fields 610I,J as "Good" using the User Interface 230.

Processing by Evaluate Output component 310D is then complete, as shown in step 870. Referring again to FIG. 3, the received PTF is then processed according to a Send Copy to Production component 310E.

Figure 9:
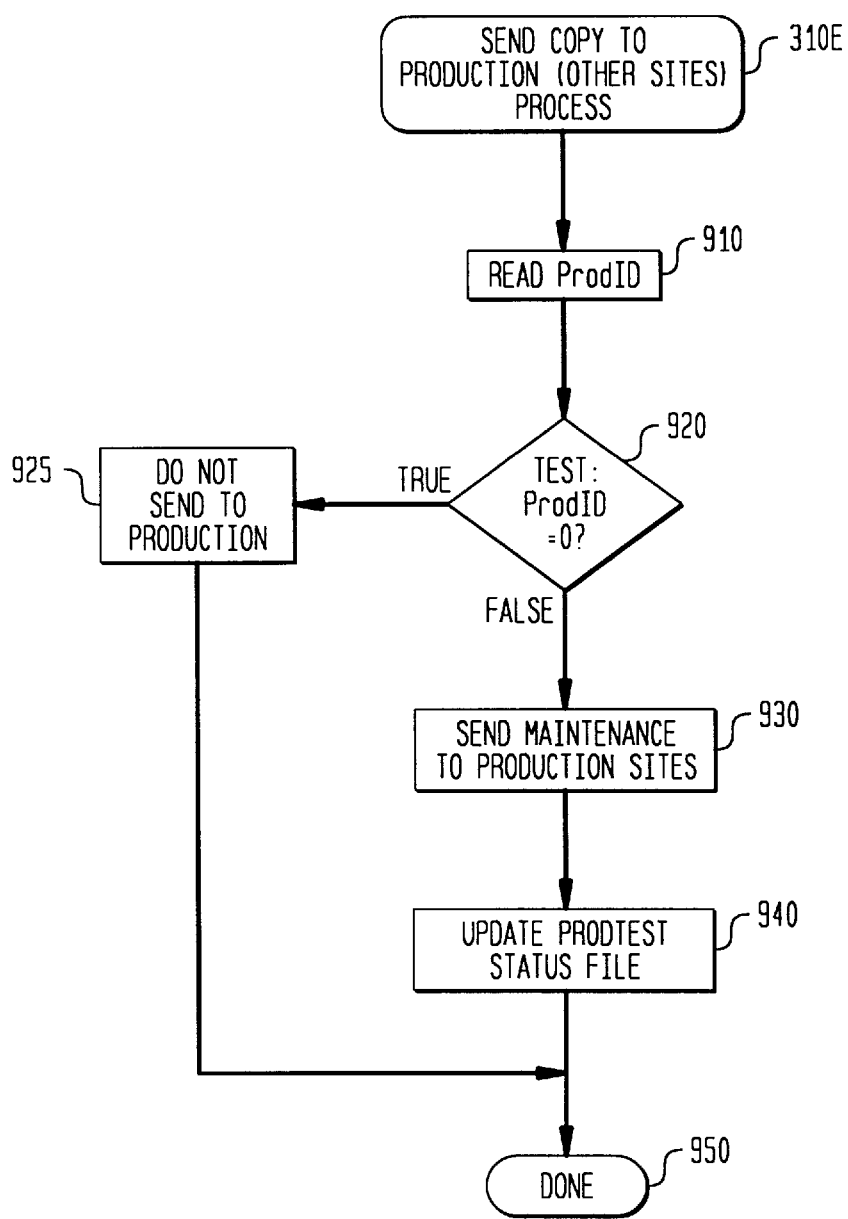
FIG. 9 is a flow-chart showing the general process flow of the Send Copy to Production component according to a preferred embodiment of the present invention.

Referring to FIG. 9, the steps performed by the Send Copy to Production component 310E shall now be explained. Once the Send Copy to Production component 310E of the automated software maintenance system 110 is invoked, processing continues according to steps 910–950. The Send Copy to Production component 310E is invoked under any of three conditions: (1) where the software product associated with a PTF is not installed on any local system 125, the PTF is passed directly to the Send Copy to Production component 310E; (2) where status fields 610I,J are marked "Good" and the PTF is to be sent by itself (i.e., not along with other PTFs, as determined from the PRODTEST table), the Send Copy to Production component 310E is invoked immediately after 610I,J is set; or (3) where the PTF is to be packaged with other PTFs which are built for the same FMID, the PTFs will be collected, packaged and sent after a predetermined time. Therefore, when any of these conditions exists, processing continues according to step 910.

In step 910, the Send Copy to Production component 310E reads a ProdId value from the FMID table associated with the PTF being processed. As described above, the FMID table contains a list that cross-references each PTF with corresponding end user system(s) 250. The ProdID value in the FMID table is initially set to "0," and is updated by the owner/administrator of the automated software maintenance system 110 when a PTF is ready to be sent to an end user system(s) 250. Once the ProdId value has been read by the Send Copy to Production component 310E, processing according to step 910 is complete.

In step 920, the Send Copy to Production component 310E tests the value of the ProdID read in step 910. If the ProdID value is set to "0," then no end user system(s) 250 receive a copy of the PTF, as shown in step 925. If the ProdID value is set to any positive integer other than "0," then processing continues according to step 930.

In step 930, the Send Copy to Production component 310E sends a copy of the PTF to any production sites that require it (i.e., to end user system(s) 250). To determine which end user system(s) 250 require the PTF, the Send Copy to Production component 310E compares the ProdID value against a PRODTEST communication table (not shown). The PRODTEST table contains a list of the production sites (i.e., end user system(s) 250) that are to receive each PTF. Using distribution network 240 (or other suitable means), the Send Copy to Production component 310E then transmits the PTF being processed to each production site that requires it. Where a distribution network 240 is unavailable, conventional methods of software transmittal may instead be utilized. Processing according to step 930 is then complete, and processing continues according to step 940.

In step 940, the Send Copy to Production component 310E updates a status file (not shown) associated with the PRODTEST communication table to indicate that the PTF has been transmitted. The PRODTEST status file, therefore, becomes a log of where each PTF has been sent.

Processing by the Send Copy to Production component 310E is then complete, as shown in step 950. Referring again to FIG. 3, the operation of a Notify Interested Personnel component 310F shall now be described.

As described above, the Notify Interested Personnel component 310F coordinates the exchange of information between the software developers 210, software Test 320, system manager(s) 120, 140, and end users 250. To accomplish this, the Notify Interested Personnel component 310F provides means for each of the aforementioned entities to transmit messages between each other, as well as to monitor the status of PTFs that are being (or have been) processed. Techniques for transmitting and monitoring information in this manner are well known in the art, and will therefore not be considered further.

Referring again to FIG. 3, the operation of a Once a Day component 310G shall now be described. The Once a Day component 310G automatically performs a variety of functions on a periodic basis. It is preferably used to perform repetitive functions that are performed on a daily basis (i.e., just after midnight when overall system loading is at a minimum). By providing automatic execution of repetitive, periodic functions, the Once a Day component 310G reduces that amount of work that might otherwise be manually performed by system manager(s) 120, 140.

Figure 10:
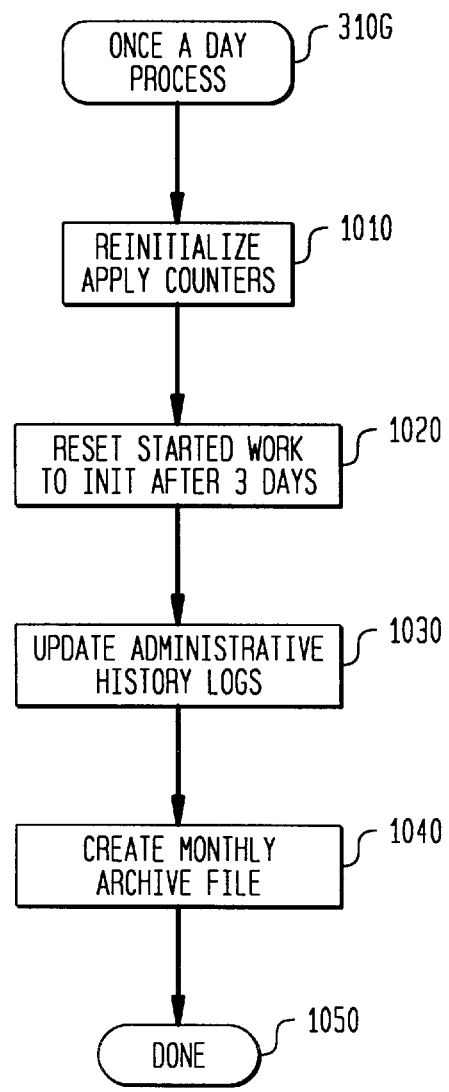
FIG. 10 is a flow-chart showing the general process flow of the Once A Day component according to a preferred embodiment of the present invention.
Figure 11:
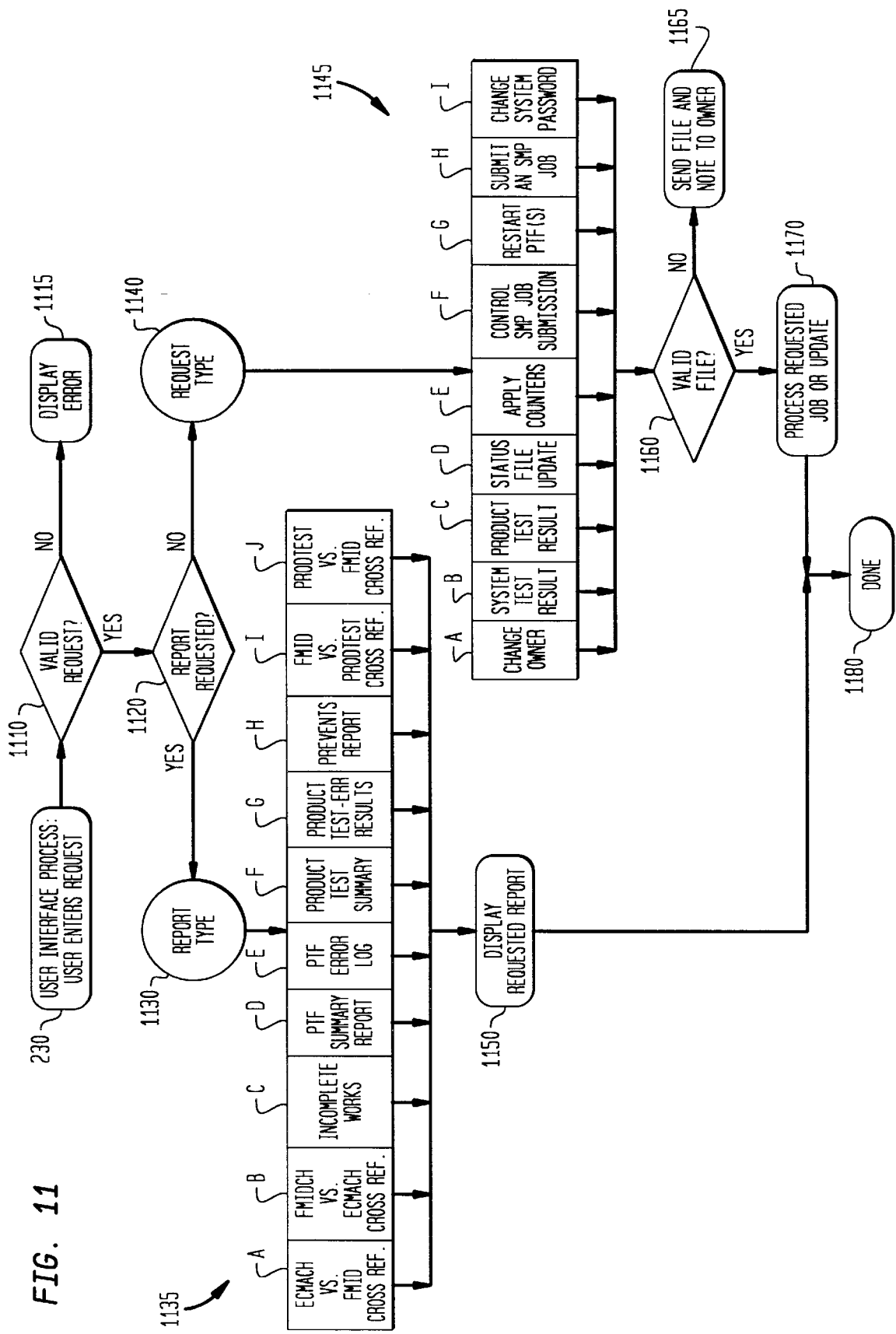
FIG. 11 is a flow-chart showing the general process flow of the User Interface component according to a preferred embodiment of the present invention.

Referring to FIG. 10, the functions performed by the Once a Day component 310G in a preferred embodiment, as shown by steps 1010–1050, may be described.

As shown in FIG. 10, the functions performed by the Once a Day component 310G may be depicted in flowchart form. One skilled in the art will recognize that the order of the steps shown is not essential, and other sequences are therefore possible. As stated above, the Once a Day component 310G runs automatically, generally one time per day, and at a time when overall system loading is at a minimum.

In step 1010, the Once a Day component 310G reinitializes, as required, the apply counter(s) associated with any PTFs that are being processed. As discussed above, the apply counter(s) may be used to limit the number of PTFs that are submitted to a particular system (i.e., therefore functioning as a ceiling on the number of jobs to submit). By automatically reinitializing the apply counter(s) to a predetermined value, the processing density flow of PTFs can automatically be managed. Once the apply counters have been reinitialized, processing continues according to step 1020.

In step 1020, the Once a Day component 310G resets the status of all PTFs that are being processed to "Init" to ensure that all jobs get run. The resetting of step 1020 may be performed on a daily basis, or less frequently (i.e., every three days). Once all PTF status has been reset, processing continues according to step 1030.

In step 1030, the Once a Day component 310G updates any administrative history logs (not shown) that are being maintained. By automatically updating these logs, the Once a Day component 310G greatly simplifies administrative oversight of the automated software maintenance system 110. For example, by reviewing an administrative history log, the system manager 120 can track user requests (to be discussed further below), detect recurring problems, and isolate bugs in particular pieces of software. Once the administrative history logs have been updated, processing continues according to step 1040.

In step 1040, the Once a Day component 310G creates and maintains a periodic archive file (not shown). This periodic archive file is preferably based on the status files associated with PTFs, and reflects completed work on a monthly basis (i.e., status file information from PTFs that have been processed completely). This one archive file therefore represents all the status files for all the PTFs that have been processed. By collecting the information into a single file; administrative monitoring/oversight is again greatly simplified. In addition, the Once a Day component 310G can further simplify administrative oversight by automatically generating reports reflecting the information that it has collected and processed.

Once step 1040 has been completed, processing according to the Once a Day component 310G is complete, as shown by step 1050. Referring again to FIG. 3, the operation of a User Interface component 230 shall now be described. The User Interface component 230 permits system manager(s) 120, 140 to interface with the automated software maintenance system 110. To accomplish this, the User Interface component 230 processes any requests entered by the system manager(s) 120, 140. The sequence of this process is shown in steps 1110–1180 of FIG. 11.

In step 1110, the User Interface component 230 first determines whether the request that has been entered is a valid request. This determination is made by comparing the user's request against a predetermined list (not shown) of valid requests. If the request is invalid, then an error indication is displayed to the requestor, as shown in step 1115. If the request is valid, then processing continues according to step 1120.

In step 1120, the User Interface component 230 determines whether a report has been requested by the user. This determination is made by comparing the user's request against a predetermined list (not shown) of reports (or alternatively, of requests). If the user has requested a report, then processing continues according to step 1130. Otherwise, processing continues according to step 1140.

If step 1130 is performed (as described above), then User Interface component 230 generates the report requested by reading information contained in the tables and/or files described above. Some of the most useful reports that can be generated are shown in steps 1135A–1135J, and as detailed below.

As shown in step 1135A, the user may request an ECM-ACH versus FMID report 1135A. This report generates a list of all functions (FMIDs) for each local system 125 that is supported by the automated software maintenance system 110. The FMIDCH versus ECMACH report 1135B is a list of all local system(s) 125 for each FMID. The Incomplete Works report 1135C is a report showing any status other than "Good" or "Init" for any selected (or all) local system(s) 125. The PTF Summary report 1135D shows, for each FMID, all PTFs which are at least install tested, with installation dates, as well as those PTFs which have failed. The PTF Error Log report 1135E shows a list of failed PTFs over a given period of time, with a log explanation of the failures. The Product Test Summary report 1135F lists, for each production tested FMID, the day each PTF was sent to production test, the total number of PTFs sent, and the number of errors reported by production test sites. The Product Test-Err results report 1135G shows each PTF found to be in error by any production test site(s), including which production test site detected the problem. The Prevents report 1135H is a detailed list of total installations, total products tested, and the number of errors (including how they were detected) for the current month and year to date. The FMID versus Prodtest report 1135I shows a list of production test sites for each FMID. The Prodtest versus FMID report 1135J shows a list of FMIDs for each production test site. One skilled in the art will recognize that many other reports can be generated, depending on the information that is desired. Once the requested report has been generated, the User Interface component 230 displays the report to the user, as shown in step 1150.

If step 1140 is performed (as described above), then User Interface component 230 processes the user's request by reading from and/or overwriting information contained in the tables and/or files described above. Some of the most useful requests that can be processed are shown in steps 1145A–1145I, and as described below.

As shown in step 1145A, the system manager 120 may make a Change Owner request. This request permits the status file owner field 610M to be changed as desired. The system manager 120 may also make a System Test Result request 1145B. This request permits the system manager 120 to mark the status file test result fields 610I,J "Good" or "Bad" after installation and/or test. The system manager 120 may make a Product Test Result request 1145C. This option is used by the system manager 120 to mark a PTF as "Bad" in the PRODTEST status file (when required) and to archive the result for reporting purposes. The system manager 120 may make a Status File Update request 1145D. This request is used to alter the installation status in a PTF status file or to change flags as required. The system manager 120 may make an Apply Counters request 1145E to change the apply counter value for any FMID(s). The system manager 120 may make a Control SMP Job Submission request 1145F. This option permits the system manager 120 to open or close the gate for SMP job submissions of any level for any local system(s) 125. The system manager 120 may make a Restart PTF(s) request 1145G. This option permits the system manager to restart PTFs that show started, but are not actually installed on a local system 125. The system manager 120 may make a Submit SMP Job request 1145H. This option permits the system manager to submit a Reject, Restore, or Accept job. Finally, the system manager 120 may make a Change System Password request 1145I. This option permits the system manager to make periodic password changes on any local system(s) 125 (i.e., which are used by the SMP jobs). One skilled in the art will recognize that many other requests can be processed, depending on the task that is to be performed.

Before the user's request is actually processed, however, the validity of the file that must be accessed is first checked, as shown in step 1160. If the file to be accessed is invalid (i.e., non-existent), the user (as well as the PTF owner) is notified as shown in step 1165. Otherwise, the user request is processed as shown in step 1170.

Once the requested report is generated, or the user request has been processed, processing according to the User Interface component 230 is complete, as shown in step 1180. By permitting a user (i.e., system manager 120) to interface directly with the automated software maintenance system 110, manual control over the otherwise automated process is made available.

Figure 12:
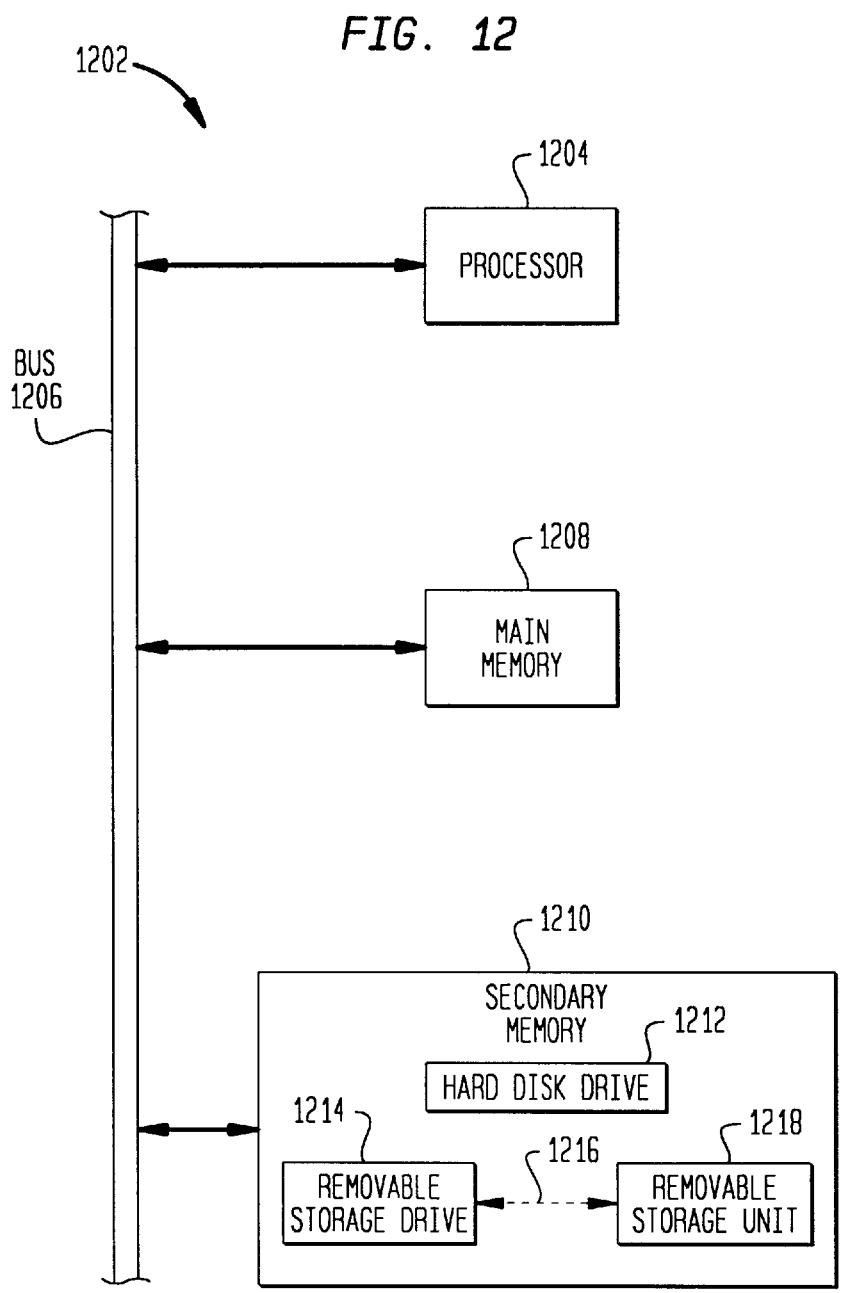
FIG. 12 depicts a computer system implementing the automated software maintenance system of the present invention.

In one embodiment, the invention is directed to a computer system operating as discussed herein. An exemplary computer system 1202 is shown in FIG. 12. The computer system 1202 includes one or more processors, such as processor 1204. The processor 1204 is connected to a communication bus 1206.

The computer system 1202 also includes a main memory 1208, preferably random access memory (RAM), and a secondary memory 1210. The secondary memory 1210 includes, for example, a hard disk drive 1212 and/or a removable storage drive 1214, representing a floppy disk drive, a magnetic tape drive, a compact disk drive, etc. The removable storage drive 1214 reads from and/or writes to a removable storage unit 1218 in a well known manner.

Removable storage unit 1218, also called a program storage device or a computer program product, represents a floppy disk, magnetic tape, compact disk, etc. As will be appreciated, the removable storage unit 1218 includes a computer usable storage medium having stored therein computer software and/or data.

Computer programs (also called computer control logic) are stored in the main memory 1208 and/or the secondary memory 1210. Such computer programs, when executed, enable the computer system 1202 to perform the features of the present invention as discussed herein. In particular, the computer programs, when executed, enable the processor 1204 to perform the features of the present invention. Accordingly, such computer programs represent controllers of the computer system 1202.

In another embodiment, the invention is directed to a computer program product comprising a computer readable medium having control logic (computer software) stored therein. The control logic, when executed by the processor 1204, causes the processor 1204 to perform the functions of the invention as described herein.

In another embodiment, the invention is directed to a computer program product comprising a computer readable medium having control logic (computer software) stored therein. The control logic, when executed by the processor 1204, causes the processor 1204 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

While the present invention has been particularly shown and described with reference to a preferred embodiment thereof, it will be understood by those skilled in the art that various changes in form and details can be made therein without departing from the spirit and scope of the invention.

Having thus described our invention, what we claim as new and desire to secure by Letters Patent is:

1. A computer program product comprising:
    a computer usable medium having computer readable program code means embodied therein for causing a computer to manage the maintenance of computer software, said computer readable program code means comprising:
        computer readable program code means for receiving a software maintenance module;
        computer readable program code means for verifying the validity of said software maintenance module;
        computer readable program code means for scanning said software maintenance module to determine whether said software maintenance module requires testing;
        computer readable program code means for constructing a maintenance job for said software maintenance module; and
        computer readable program code means for distributing said software maintenance module to an end user.

2. The computer program product of claim 1, further comprising:
    computer readable program code means for submitting said software maintenance module to test; and
    computer readable program code means for evaluating a result returned from said test to determine a status associated with said test.

3. The computer program product of claim 1, further comprising:
    computer readable program code means for allowing a system manager to control operation of said computer program product.

4. The computer program product of claim 3, further comprising:
    computer readable program code means for processing a request made by a system manager.

5. The computer program product of claim 1, further comprising:
    computer readable program code means for automatically generating reports on a periodic basis.

6. The computer program product of claim 5, comprising computer readable program code means for automatically resubmitting incomplete work on a periodic basis.

7. The computer program product of claim 1, further comprising:
    computer readable program code means for coordinating exchange of information between a software developer, software test, and an end user.

8. A program storage device readable by a machine, tangibly embodying a program of instructions executable by the machine to perform method steps for managing the maintenance of computer software, said method steps comprising:
    receiving, from a computer software center over a receiving network, a software maintenance module;
    verifying, in a local processing system, whether said software maintenance module is valid;
    scanning, using the local processing system, a status file to determine whether said software maintenance module is ready to be submitted to the local processing system;
    building, using the local processing system, a maintenance (batch) job for said software maintenance module and submitting said software maintenance module to the local processing system;
    evaluating, using the local processing system, a result returned from said local processing system, to determine a status associated with submission; and
    distributing, over a distribution network, said software maintenance module to an end user.

9. The program storage device of claim 8, wherein said verifying step further comprises:
    verifying whether said software maintenance module requires test.

10. The program storage device of claim 8, wherein said method steps further comprise the step of:
    determining, using the local processing system, whether said software maintenance module requires test.

11. The program storage device of claim 8, wherein said method steps further comprise the steps of:
    controlling, in said local processing system, the frequency of submission of said software maintenance modules to test;
    maintaining, in said local processing system, an administrative history log indicative of received, tested and distributed computer maintenance modules; and
    creating, in said local processing system, on a periodic basis an archive file of computer maintenance modules.

12. The program storage device of claim 8, wherein said method steps further comprise the step of:
   processing, in a user interface, a request made by a system manager.

13. The program storage device of claim 12, wherein said processing step comprises the step of processing a request for a report made by said system manager.

14. A method for managing computer software maintenance for use in a computer system having a receiving network, a local processing system, and a distribution network, comprising the steps of:
   receiving, from a computer software center over said receiving network, a software maintenance module;
   verifying, using the local processing system, whether said software maintenance module is valid;
   scanning, using the local processing system, a status file to determine whether said software maintenance module is ready to be submitted to the local processing system;
   building, using the local processing system, a maintenance (batch) job for said software maintenance module and submitting said software maintenance module to the local processing system;
   evaluating, using the local processing system, a result returned from said local processing system, to determine a status associated with said submission; and
   distributing, over said distribution network, said software maintenance module to an end user.

15. The method of claim 14, wherein said verifying step further comprises:
   verifying whether said software maintenance module requires test.

16. The method of claim 14, further comprising the step of:
   determining, using the local processing system, whether said software maintenance module requires test.

17. The method of claim 14, further comprising the steps of:
   controlling, in said local processing system, the frequency of submission of said software maintenance modules to test;
   maintaining, in said local processing system, an administrative history log indicative of received, tested and distributed computer maintenance modules; and
   creating, in said local processing system, on a periodic basis an archive file of computer maintenance modules.

18. The method of claim 14, further comprising the step of:
   processing, in a user interface, a request made by a system manager.

19. The method of claim 18, wherein said processing step comprises the step of processing a request for a report made by said system manager.

20. A system for managing computer software maintenance using a computer system having a receiving network, a processing sub-system, and a distribution network, comprising:
   means for receiving, from a computer software center over said receiving network, a software maintenance module;
   means for verifying whether said software maintenance module is valid;
   means for scanning a status file to determine whether said software maintenance module is ready to be submitted to the processing sub-system;
   means for building a maintenance (batch) job for said software maintenance module and submitting said software maintenance module to the processing sub-system;
   means for evaluating a result returned from said processing sub-system, to determine a status associated with said submission; and
   means for distributing said software maintenance module to an end user.

21. The system of claim 20, further comprising:
   means for determining whether said software maintenance module requires test.

22. The system of claim 20, further comprising:
   means for controlling the frequency of submission of said software maintenance modules to test;
   means for maintaining an administrative history log indicative of received, tested and distributed computer maintenance modules; and
   means for creating on a periodic basis an archive file of computer maintenance modules.

23. The system of claim 20, further comprising:
   means for processing a request made by a system manager.

24. The system of claim 23, wherein said processing means comprises means for processing a request for a report made by said system manager.

* * * * *